(12) United States Patent
Simpson et al.

(10) Patent No.: US 8,208,608 B2
(45) Date of Patent: *Jun. 26, 2012

(54) METHOD AND SYSTEM OF PROVIDING PERSONAL AND BUSINESS INFORMATION

(75) Inventors: Todd Garrett Simpson, Calgary (CA); Christopher Edward Lugg, Calgary (CA)

(73) Assignee: Call Genie Inc., Calgary (CA)

( * ) Notice: Subject to any disclaimer, the term of this patent is extended or adjusted under 35 U.S.C. 154(b) by 716 days.

This patent is subject to a terminal disclaimer.

(21) Appl. No.: 12/365,618

(22) Filed: Feb. 4, 2009

(65) Prior Publication Data

US 2009/0204408 A1 Aug. 13, 2009

Related U.S. Application Data

(63) Continuation of application No. 10/906,217, filed on Feb. 9, 2005, now Pat. No. 7,505,568.

(60) Provisional application No. 60/542,983, filed on Feb. 10, 2004.

(51) Int. Cl.
*H04M 1/64* (2006.01)
*G10L 15/00* (2006.01)

(52) U.S. Cl. ............... 379/88.01; 379/91.01; 455/456.3; 455/563; 704/9; 704/257; 704/270.1; 704/273; 704/276; 705/14.49; 705/26.7; 705/28; 709/220; 725/91

(58) Field of Classification Search ............... 379/88.01, 379/91.01; 704/270.1, 273, 9, 257, 276; 705/28, 14.49, 26.7; 709/220; 455/456.3, 455/563; 725/91
See application file for complete search history.

(56) References Cited

U.S. PATENT DOCUMENTS 5,655,007 A * 8/1997 McAllister ................. 379/91.01
6,052,439 A 4/2000 Gerszberg
(Continued)

FOREIGN PATENT DOCUMENTS

WO WO98/51064 11/1998
(Continued)

OTHER PUBLICATIONS

Kelman Eve, Combining wireless location services with enterprise ebusiness applications, Internet article, Proceedings of Map Asia 2002 Conference, Aug. 7, 2002, Bangkok, Thailand, http://www.gisdevelopment.net/technology/lbs/techlbs007pf.htm.

(Continued)

*Primary Examiner* — Gerald Gauthier
(74) *Attorney, Agent, or Firm* — Bennett Jones LLP

(57) ABSTRACT

A multi-modal system providing for a single point of contact that can allow users to manage their personal contact information and contact lists, and connect to other users and businesses in a personalized, efficient, location-sensitive and organized manner. By accessing the system using any type of telephony-based device, a user can manage all of their personal and business contacts as well as perform generalized searches in public databases, such as white page and/or yellow page listings, or more personalized searches through databases of their business or personal contacts. A user may also, during a generalized search, go to a personalized search, and vice-versa. The system may also provide users with the opportunity to select certain businesses from their contact lists and allow these businesses to provide them with personalized data, either on demand or based on user-controlled permissions or areas of interest through various technologies including presence technologies.

30 Claims, 5 Drawing Sheets

U.S. PATENT DOCUMENTS

| | | | |
|---|---|---|---|
| 6,065,016 A | 5/2000 | Stuntebeck et al. | |
| 6,269,369 B1 | 7/2001 | Robertson | |
| 6,404,884 B1 | 6/2002 | Marwell et al. | |
| 6,415,281 B1 | 7/2002 | Anderson | |
| 6,462,616 B1 | 10/2002 | Beswick | |
| 6,523,021 B1 | 2/2003 | Monberg et al. | |
| 6,529,724 B1 | 3/2003 | Khazaka et al. | |
| 6,870,915 B2 | 3/2005 | Stillman et al. | |
| 6,944,447 B2 | 9/2005 | Portman | |
| 7,103,550 B2* | 9/2006 | Gallagher et al. | 704/270.1 |
| 7,359,858 B2* | 4/2008 | Gong et al. | 704/257 |
| 7,412,260 B2* | 8/2008 | Gailey et al. | 455/563 |
| 7,505,568 B2* | 3/2009 | Simpson et al. | 379/88.01 |
| 7,603,291 B2* | 10/2009 | Raiyani et al. | 705/26.7 |
| 7,793,326 B2* | 9/2010 | McCoskey et al. | 725/91 |
| 7,860,519 B2* | 12/2010 | Portman et al. | 455/456.3 |
| 7,970,648 B2* | 6/2011 | Gailey et al. | 705/14.49 |
| 2002/0035474 A1 | 3/2002 | Alpdemir | |
| 2002/0059402 A1* | 5/2002 | Belanger | 709/220 |
| 2002/0118811 A1 | 8/2002 | Davis et al. | |
| 2002/0161587 A1* | 10/2002 | Pitts et al. | 704/276 |
| 2002/0169611 A1 | 11/2002 | Guerra et al. | |
| 2002/0184199 A1 | 12/2002 | Celik | |
| 2002/0188620 A1 | 12/2002 | Doss et al. | |
| 2003/0028889 A1* | 2/2003 | McCoskey et al. | 725/91 |
| 2003/0032409 A1 | 2/2003 | Hutcheson et al. | |
| 2003/0125958 A1 | 7/2003 | Alpdemir et al. | |
| 2003/0179866 A1 | 9/2003 | Stillman et al. | |
| 2004/0093317 A1 | 5/2004 | Swan | |
| 2004/0117275 A1* | 6/2004 | Billera | 705/28 |
| 2004/0260604 A1 | 12/2004 | Bedingfield, Sr. | |
| 2005/0053201 A1 | 3/2005 | Bhargava et al. | |
| 2005/0120009 A1* | 6/2005 | Aker | 707/3 |
| 2006/0218184 A1* | 9/2006 | Scholl et al. | 707/104.1 |
| 2007/0179778 A1* | 8/2007 | Gong et al. | 704/9 |
| 2009/0204408 A1* | 8/2009 | Simpson et al. | 704/273 |

FOREIGN PATENT DOCUMENTS

| | | |
|---|---|---|
| WO | WO99/25136 | 5/1999 |
| WO | WO01/40968 | 6/2001 |
| WO | WO01/89183 | 11/2001 |

OTHER PUBLICATIONS

Anonymous, Airflash SmartZone Platform, Internet article, Airflash Inc., Oct. 21, 2002, http://web.archive.org/web/20011021232038/airflash.com/products.html.

* cited by examiner

| | |
|---|---|
| [User calls the personalized search access number] | ~87 |
| Welcome to My Personal Search, what is your Name? | ~89 |
| John Doe | ~91 |
| Thanks John; to verify your identity please repeat back to me: 53416 | ~93 |
| 5 3 4 1 6 | ~95 |
| Excellent! What can I do for you? | ~97 |
| I need a dentist appointment | ~99 |
| You have bookmarked Dr. Enamel. Note that Dr. Enamel is out of town until February 7th. Would you like to use this bookmark? | ~101 |
| No | ~103 |
| OK, I will look for other dentists for you. | ~105 |
| Would you like a dentist near you? | ~107 |
| Sure | ~109 |
| I have located you at approximately 6th Street and 8th Avenue; is this correct? | ~111 |
| Yes | |
| OK, there are eight dentists nearby. Please state the name or number of the dentist you want as I list them for you. One, Dr. Roots who specializes in extractions; two, Dr. Cap, the bright smile expert; three, Dr... | ~113 |
| Dr. Cap please | ~115 |
| OK, what would you like to do next? You can ask for the address, more information, or you can bookmark Dr. Cap in My Personal Search. | ~117 |
| Bookmark him! | ~119 |
| Done, Dr. Cap offers personalized on-line booking for My Personal Search users; Do you want to leave Dr. Cap with the keyword dentist, or assign him another keyword? | ~121 |
| Dentist is fine | |

| | |
|---|---|
| Dr. Cap often has specials on tooth whitening supplies; would you like to be alerted when the next special is announced? | ~123 |
| No | ~125 |
| No problem, What would you like to do? | ~127 |
| Book an appointment. | ~129 |
| JOHN, WELCOME TO DR. CAP'S PERSONALIZED SEARCH BOOKING SYSTEM. DO YOU WANT THE QUICKEST APPOINTMENT, OR WOULD YOU LIKE TO BOOK IN THE FUTURE? | ~131 |
| I need a quick appointment. | |
| UNDERSTOOD - WE HAVE AN OPENING AT 4:15 TODAY. WOULD YOU LIKE TO BOOK IT? | |
| Yes please | |
| Done, what would you like to do next? | ~133 |
| I need directions. | ~135 |
| Certainly, Dr Cap is located at the eight and eight medical clinic, southwest. It is just across from XYZ Inc. Is there anything else? | ~137 |
| Yes, a new search please. | ~139 |
| OK, what can I do for you? | |
| An Italian Restaurant. | ~141 |
| Oh, you don't have any Italian Restaurant's bookmarked; I will start a general search. | ~143 |
| Did you want an Italian restaurant near you? | |
| Sure | |
| I have found twelve Italian restaurants... | ~145 |

FIG. 5

METHOD AND SYSTEM OF PROVIDING PERSONAL AND BUSINESS INFORMATION

FIELD OF THE INVENTION

The present invention relates to the field of interactive systems for providing automated and personalized directory assistance to customers who want to access and manage personal and business information and/or contacts.

BACKGROUND OF THE INVENTION

Presently, when looking for personal or business information, a variety of different approaches can be used, most being centered on the use of a telephone. The first step in most approaches involves locating personal or business information by browsing through printed materials (i.e., phone books, newspapers, and direct marketing materials), consulting electronic resources (i.e., the Internet, computer-based contact lists stored in personal digital assistants (PDAs) or cell phones, etc.), or recalling the contact information from memory. The sources consulted to obtain the business or personal information will vary significantly based on the location of the user. For example, if users are traveling and are away from their office or place of residence, contact information stored in a personal information manager (PIM) or on a cell phone will commonly be used, while physical or computer-based lists will be more commonly used when users are at home or at the office. Once an individual has located the information, a telephone is used to connect with the personal or business contact.

In many parts of the world, the telephone is the most pervasive and ubiquitous means to find businesses and services for a consumer, and is often the expected means of contact with many businesses. Although the primary usage mode of telephony has remained largely the same since its inception, recent technological advances have begun to broaden the possible applications of the telephone. Such advances include the introduction of digital mobile services (i.e., contact lists, messaging (short message service (SMS), multimedia messaging service (MMS), presence technology (instant messaging and presence service (IMPS) and internet access (wireless application protocol (WAP) or extensible hypertext markup language (XHTML)), voice over Internet protocols (i.e., session initiation protocol (SIP) and IMPS), and voice portals using automated voice recognition (AVR) protocols and text-to-speech (TTS) protocols to provide automated access to data using voice commands. With the advent of automated interactive voice recognition (IVR) and TTS technology, automated voice portals are becoming more commonplace, especially as interfaces for directory assistance systems and help lines.

Through these telephonic technological advances, contact list maintenance and ownership has been rapidly evolving. Presently, contact lists and IMPS are the current evolution of how people manage their phone numbers, addresses, etc. In many respects, this forms the central activity in phone management, just as the address book on a personal computer is a central aspect of email. The contact interface, on both the mobile telephony networks and personal computers, is actively evolving into IMPS.

IMPS can be seen as a "real-time" and "meta-organized" contact list. A presence-enabled system tells each user the current real-time status of other users of interest, based on the permissions set by those other users. In the internet world, presence has been available on instant messaging systems (such as AOL messenger or MSN messenger) for some time.

In the mobile telephony world, presence will allow not only for availability, but also indicators such as: phone is on/off, user status (available, unavailable, in a meeting, traveling, etc.), location, device capabilities (voice only, text, multimedia, browser, etc.), personal status (happy, sad, angry, etc.), hobbies (soccer, dancing, etc.), and any other attribute that is defined by the service provider. These types of status can be displayed within the contact list. Of course, "instant messaging" is enabled based upon these user settings.

Meta-organization is provided through groups of presences (setup either by the user, by the service provider, or a third party), through "group chat" and through shared content, which can be made available to other users and/or groups. Presence and interest "channels" can be filled by content providers based on opt-in permissions guided by each user. In the example above, if "soccer" was an area of interest for a given user, and that user had opened permissions for third parties to populate their "soccer" channel, then any interested third party could submit entries into that channel. Presence servers can accept "plug-ins" from other vendors, extending the functionality and applicability.

However, these technological advances still have not simplified the process of locating personal and business contact information, and connecting the user with the person or business of interest. Moreover, the use of presence technology and IMPS is quite limited because of various factors, which include, but are not limited to, device type and configuration, and therefore, cannot be used very easily, ubiquitously or universally. These technologies can also still not be reliably used to obtain current information on retailers and businesses.

Consequently, the need has arisen for a system providing for a single point of contact that can connect customers to personal or business contacts and contact lists in an efficient, organized and personalized manner, and provide current information in a timely and localized fashion.

BRIEF SUMMARY OF THE INVENTION

In accordance with a broad aspect of the present invention, there is provided a system for managing personalized contact information using a telephony-based device, comprising: (a) a voice recognition engine for translating spoken language into data; (b) a text to speech system for translating data to speech; (c) a user identification system; (d) a personalized database of personal contacts for a user; (e) a voice interface to the personalized database; (f) a database of public directory information; and (g) a voice interface to the database of public directory information, wherein a user manages personalized contact information by searching the personalized database of personal contacts and the database of public directory information.

In one embodiment, the user transfers from a search in the personalized database of personal contacts to a search in the database of public directory information to locate contacts to add to the personalized database of personal contacts. In one embodiment, the user returns to the search in the personalized database of personal contacts after the search in the database of public directory information. In one embodiment, the user transfers information from a search in the database of public directory information to the personalized database of personal contacts to add contacts to the personalized database of personal contacts. In one embodiment, the user returns to the search in the database of public directory information after adding contacts to the personalized database of personal contacts. In one embodiment, the user transfers from a search in the personalized database to a search in the database of public directory information while maintaining at least some state information. In one embodiment, the user transfers from a search in the database of public directory information to a search in the personalized database while maintaining at least some state information. In one embodiment, the user assigns attributes or permissions to personal contacts stored in the personalized database. In one embodiment, the personal contacts are given permission to send notifications to the user. In one embodiment, the notifications are selected from the group consisting of marketing material, availability of services, and both marketing information and availability of services. In one embodiment, the notifications are sent using presence technologies. In one embodiment, the user searches the database of public directory information to populate the personalized database. In one embodiment, search results obtained from a search of the personalized database are ranked using weighting factors. In one embodiment, search results obtained from a search of the personalized database and the database of public directory information are location-specific.

In accordance with another broad aspect of the present invention, there is provided a multi-modal system for managing personalized information using a telephony-based device comprising: (a) a personalized database including information on a plurality of businesses and personal contacts for a user; (b) a system server through which each business and personal contact in the database is assigned to a category and for associating criteria to each business and personal contact; and (c) a user interface to the system server for allowing the user to enter a search request to locate a business or personal contact within a selected category, the system server determining the appropriate information to be gathered from the user and generating a list of businesses or personal contacts based on the category selected by the user.

In one embodiment, the user enters a search request using voice-only commands. In one embodiment, the user interface is selected from a web-based interface, a WAP-based interface, a messaging interface and a multi-modal interface. In one embodiment, businesses and personal contacts are given permission to send the user notifications. In one embodiment, the notifications are sent using presence technologies. In one embodiment, the notifications are selected from the group consisting of marketing material, service availability, and both marketing information and service availability. In one embodiment, the user connects to a business or personal contact selected from the personalized database directly through the multi-modal system. In one embodiment, the user connects to the business or personal contact through the multi-modal system via an enterprise database. In one embodiment, the user makes an appointment with the business or personal contact using the enterprise database.

In accordance with another broad aspect of the present invention, there is provided a method for managing personalized contact information using a telephony-based device, comprising: (a) providing a personalized database including information on a plurality of businesses and personal contacts through which each business and personal contact in the database is assigned to a category and for associating criteria to each category; (b) accepting a search request from a user to locate a business or personal contact within a selected category; and (c) operating the system server to obtain appropriate information from the user based on the criteria associated with the category of interest and searching the database to generate of list of businesses or personal contacts from the category selected by the user.

In one embodiment, the method further comprises determining a location of interest to the user and generating the list of businesses or personal contacts to highlight businesses or personal contacts proximal to the location of interest. In one embodiment, the criteria associated with a category includes the setting of permissions to determine whether a business or a personal contact can send notifications to the user. In one embodiment, the notifications are selected from the group consisting of marketing information, availability of services, and both marketing information and availability of services. In one embodiment, the notifications are sent to the user using presence technologies.

In accordance with another broad aspect of the present invention, there is provided a method for managing personalized contact information using a telephony-based device, comprising: (a) providing a voice recognition server to translate spoken language into data and a text-to-speech system to translate data to speech; (b) providing a user identification system, through which a user authenticates prior to accessing personalized contact information; (c) providing a personalized database of personal contacts and a voice interface, which an authenticated user uses to build, maintain and search the personalized database; and (d) providing a database of public directory information and a voice interface, which an authenticated user uses to search and obtain information from the database of public directory information to add to the personalized database.

In one embodiment, the user transfers from a search in the personalized database of personal contacts to a search in the database of public directory information to locate contacts to add to the personalized database of personal contacts. In one embodiment, the user returns to the search in the personalized database of personal contacts after the search in the database of public directory information. In one embodiment, the user transfers information from a search in the database of public directory information to the personalized database of personal contacts to add contacts to the personalized database of personal contacts. In one embodiment, the user returns to the search in the database of public directory information after adding contacts to the personalized database of personal contacts. In one embodiment, the user transfers from a search in the personalized database to a search in the database of public directory information while maintaining at least some state information. In one embodiment, the user transfers from a search in the database of public directory information to a search in the personalized database while maintaining at least some state information. In one embodiment, the user assigns attributes or permissions to personal contacts stored in the personalized database. In one embodiment, the personal contacts are given permission to send notifications to the user. In one embodiment, the notifications are sent using presence technologies. In one embodiment, the user searches the database of public directory information to populate the personalized database.

BRIEF DESCRIPTION OF THE DRAWINGS

FIG. 5 is a diagrammatic illustration showing an exemplary embodiment of a flow chart of a customer interaction with the system of this invention.

DETAILED DESCRIPTION OF THE EMBODIMENTS

A system, as described herein, provides for a single point of contact that can allow users to manage their personal contact information and contact lists, and connect to other users and businesses in a personalized, efficient, location-sensitive and/or organized manner. By accessing the system using any type of telephony-based device, a user can manage all of their personal and business contacts as well as perform generalized searches in public databases, such as white page and/or yellow page listings, or more personalized searches through databases of their business or personal contacts. A user may also, during a generalized search, go to a personalized search, and vice-versa. The system may also provide users with the opportunity to select certain businesses from their contact lists and allow these businesses to provide them with personalized data, either on demand or based on user-controlled permissions or areas of interest through various technologies including presence technologies. Businesses that have not been added to a user's personal contact list may provide the user with relevant information based on the known attributes of that user, which can include, for example, which are not meant to be limiting, location, type of telephony device used, interests, etc.

Figure 1:
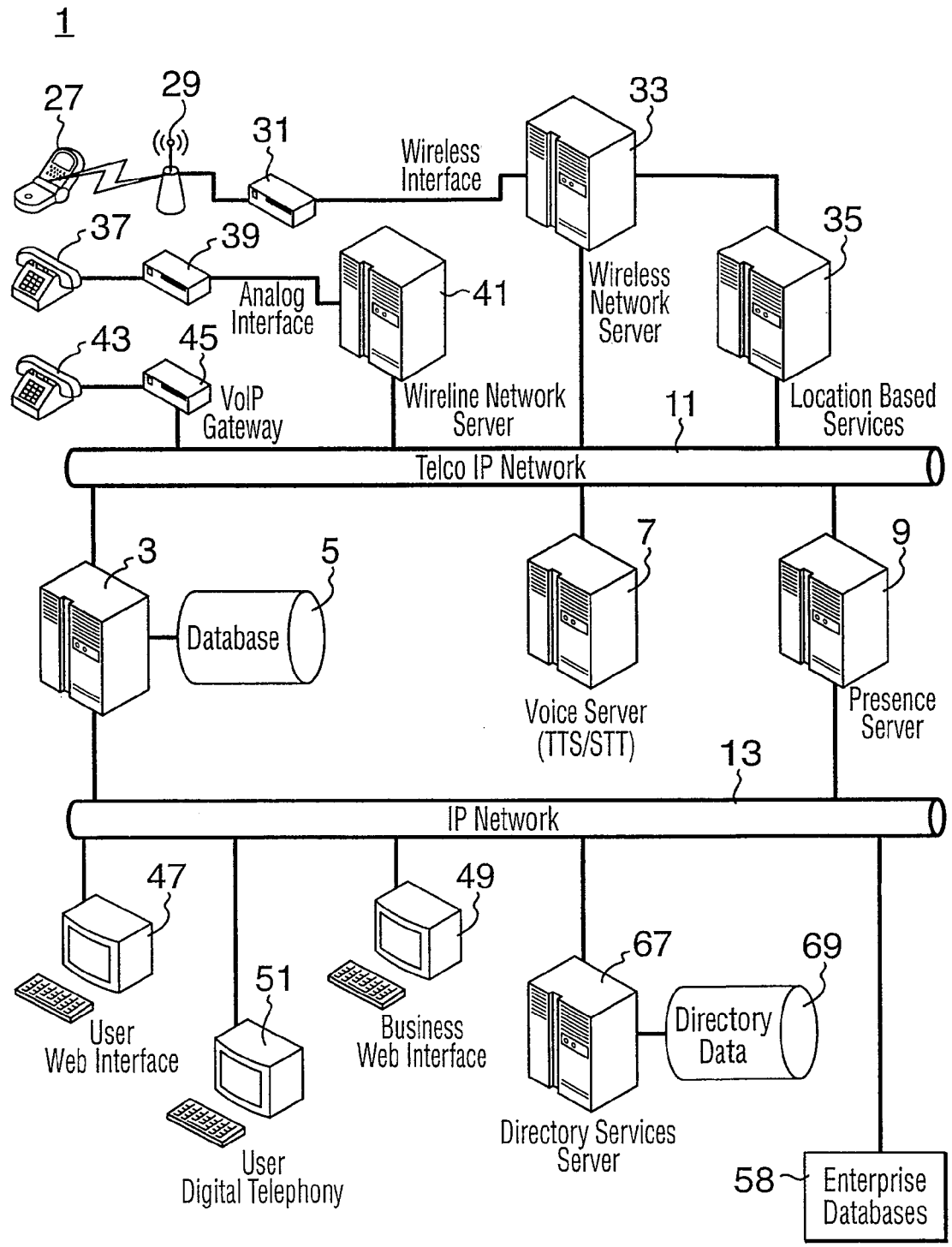
FIG. 1 is a high level view of one embodiment of the system of this invention.
Figure 2:
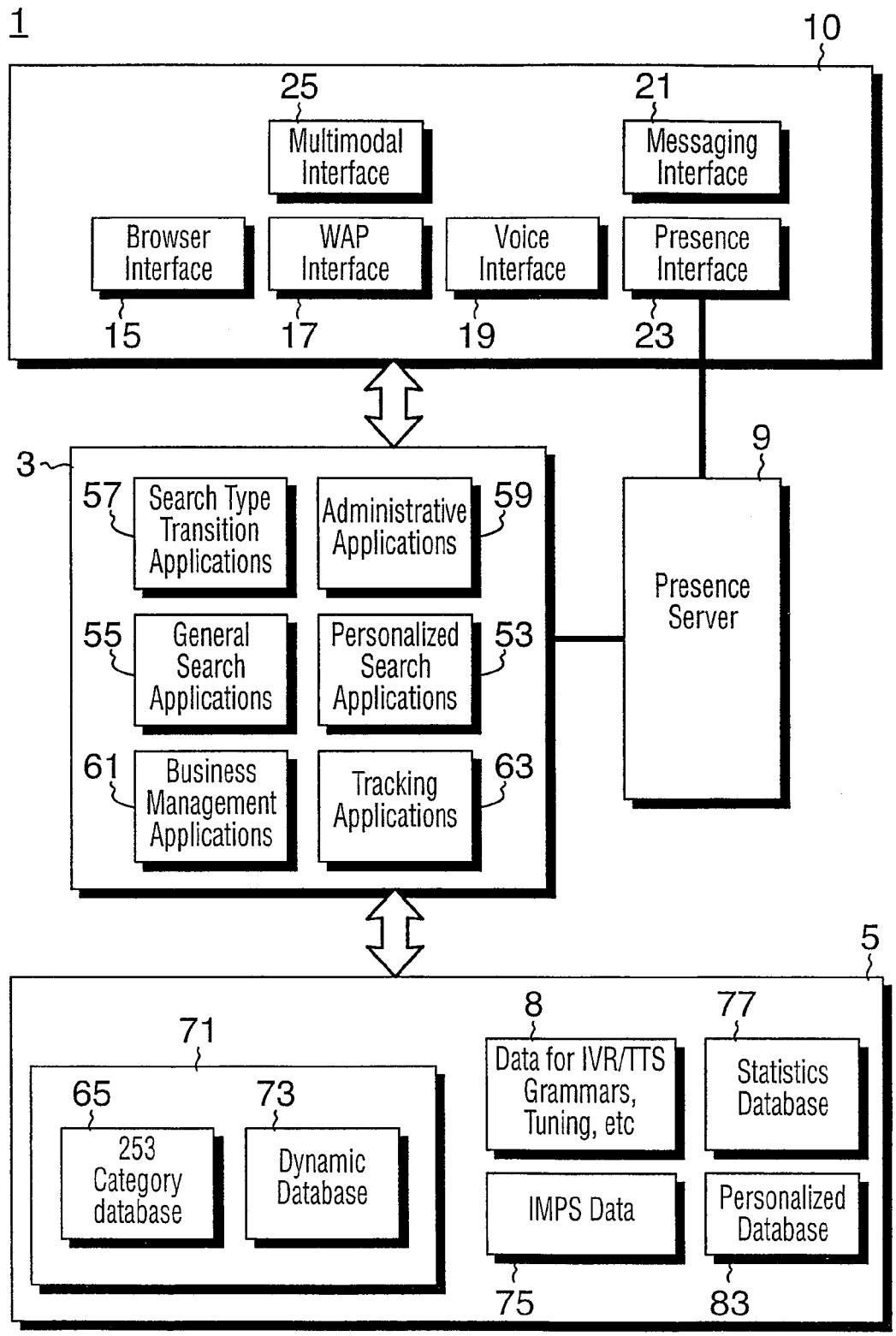
FIG. 2 is a diagrammatic illustration showing an exemplary embodiment of the components of the system of this invention.

FIGS. 1 and 2 show a possible embodiment of a multi-modal system 1 of the present invention, which comprises at least a system server 3, a database 5, a voice recognition server 7, a presence server 9, and an interface 10. Multi-modal system 1 can be accessed through interface 10 using both a telecommunication internet protocol network 11 and/or an internet protocol network 13.

In multi-modal system 1, as illustrated in FIGS. 1 and 2, different formats of communication can be used together to facilitate and encourage use. In one embodiment, multi-modal system 1 can interact with any permanently connected or periodically connected device. As examples, which are not meant to be limiting, devices such as landline telephones, cellular phones, smart phones, PDAs, internet appliances, personal computers, Voice-over-IP devices, wap-based devices and the like can be interfaced with multi-modal system 1. Of course, one skilled in the art will understand that many different communication devices are available and continue to evolve rapidly, and although the details of different communication devices may vary greatly, each can be easily interfaced with multi-modal system 1.

Interfacing multi-modal system 1 with various communication devices can be accomplished through the use of a number of gateways and interfaces. As is apparent, the types of gateways and interfaces that will be used will vary with the type of communication device. FIG. 1 only illustrates a few of the possible types of communication devices that can be used with multi-modal system 1. One of skill in the art will recognize that several other types of communication devices can easily be used with the system.

As illustrated in FIGS. 1 and 2, interface 10 can adopt a variety of different forms, which can include, but are not limited to, a web-browser interface 15, a WAP interface 17, a voice interface 19, a messaging interface 21, a presence interface 23, and/or a multi-modal interface 25. As will be apparent, other types of interface may also be used. Interface 10 can be used by both users and businesses. In one embodiment, it may be desirable to provide different interfaces to users and businesses in order to allow for different types of access or for the presentation of different types of data.

Voice interface 19 can adopt a wide variety of different forms, some of which are shown in FIG. 1, and can be used by both users and businesses. Of course, one of skill in the art will recognize that other types of voice-based devices as well as the future evolution of the devices shown in FIG. 1 may be used with voice interface 19. In one embodiment, a cellular phone 27 can connect with multi-modal system 1 through a cell tower 29 to a cellular phone gateway 31 to a wireless network server 33, and optionally to a location based services (LBS) server 35. LBS server 35 can obtain location information on a device, user or business using a variety of different techniques, which can include, but are not limited to, cell site triangulation and/or digital data (i.e., global positioning systems). The information gathered by LBS server 35 may be used to provide more personalized services to a user or business, by tailoring search results to businesses located in proximity to the user's current location.

A landline telephone 37 can also be used to access multi-modal system 1, as shown in FIG. 1 using voice interface 19. The landline telephone can be connected through an analog gateway 39, which is then connected to a wireline network server 41.

Voice-over-IP devices can also be used with multi-modal system 1 through voice interface 19. A voice-over-IP device such as a voice-over-IP phone 43 can connect to the system through a voice-over-IP gateway 45.

As shown in FIG. 1, web-browser interface 15 can adopt different forms and can also be used by both users and businesses. As examples, which are not meant to be limiting, two different types of web-browser interfaces may be made available. In one embodiment, a user web interface 47 can be provided to allow for users to interact with multi-modal system 1 through IP network 13. A business web interface 49 may also be provided to allow for businesses to interact with multi-modal system 1 through IP network 13. As previously discussed, it may be desirable to have separate user and business web interfaces mainly when different types of information and different levels of access are meant to be presented to users and businesses.

WAP interface 17 may also adopt different formats, and these formats may vary depending on whether a user or a business is using the interface. FIG. 1 only shows one example of the use of WAP interface 17, whereby a user can make use of a digital telephony device 51 to connect with multi-modal system 1. However, as will be apparent to one skilled in the art, other types of telephony devices could be used with WAP interface 17.

Although not illustrated in FIG. 1, messaging interface 21 (shown in FIG. 2) can adopt a variety of different formats. In one embodiment, messaging interface 21 can be used by a user or business to communicate with multi-modal system 1 via email, SMS for text-based messaging or MMS for messaging involving more data than text (i.e., pictures, sounds, video, etc.). Similarly, presence interface 23 can also adopt a variety of different formats, although these are not shown in FIG. 1, and permit interactions between a number of different telephony devices having presence-enabling technology and multi-modal system 1.

Multi-modal interface 25, as illustrated in FIG. 2, can represent an interface whereby a user or a business can access multi-modal system 1 through devices that are capable of sending or receiving information using a plurality of different communication formats. For example, which is not meant to be limiting, a user or business using a multi-modal device may communicate with multi-modal system 1 using voice commands, and receive information from the system through messaging or presence services.

Using any of the interfaces described above, users and businesses can interact with system server 3 of multi-modal system 1 through telecommunication internet protocol network 11 and/or internet protocol network 13. As discussed above, depending on the type of telephony device used by users or by businesses, the information submitted to multi-modal system 1 through telecommunication internet protocol network 11 and internet protocol network 13 may first be sent through voice recognition server 7 or presence server 9, as illustrated in FIG. 1. In the embodiment drawn in FIG. 1, voice recognition server 7 and presence server 9 are located outside of system server 3, and can be accessed through telecommunication internet protocol network 11 and/or internet protocol network 13. In one embodiment, voice recognition server 7 and presence server 9 may be hosted by telecommunications companies. However, in another embodiment, voice recognition server 7 and/or presence server 9 may be located within system server 3.

Voice recognition server 7 can be used to receive information from voice-based telephony devices, where any audio input can be converted to and from its interpreted format, using a variety of different mechanisms such as VoiceXML. This server can include several different components such as an interactive voice recognition (IVR) system, a text-to-speech (TTS) system, and/or a speech-to-text (STT) system.

An IVR system can convert a voice excerpt into a written, text segment of a specific human language, such as English, and can pass its interpretation of the voice excerpt back to system server 3. As is apparent, any human language can be interpreted by voice recognition server 7. The IVR system can be configured to recognize particular grammars to enhance the recognition rate within each step of a dialog between multi-modal system 1 and a user or business. As shown in FIG. 2, required grammars can be stored in an IVR/TTS database 8 in database 5. However, IVR/TTS database 8 can be located in other locations of multi-modal system 1, if desired. Although dialogs can be structured to allow for free form input, directed dialogs can be used should multi-modal system 1 require it. For example, users that have heavy accents can be led to a directed dialog where simple voice commands such as numbers are recognized instead of complex terms such as business names or categories.

The TTS system can take a written text segment of a human language and convert it to an audio excerpt. For example, which is not meant to be limiting, the TTS system can take any information from system server 3 that can be in written form and relay it to a user or business using a voice-based telephony device by converting the text to speech.

Presence server 9 can be used to receive information from presence interface 23. As previously described, presence-enabled systems can provide a plurality of different information on users of interest, based on the permissions set by those users. This information can be data on status, which can include, but is not limited to device status, user status, location, device capabilities, etc. Other information that can be sent through presence server 9 includes presence and interest "channels", as previously discussed.

Once information sent though telecommunication internet protocol network 11 or internet protocol network 13 has passed through voice recognition server 7 and/or presence server 9, if required, it can then reach system server 3. System server 3 may be a physical server in one embodiment as shown in FIG. 1, or it may also be software components that are hosted on other servers (not shown). Of course, one of skill in the art will understand that the complexity of system server 3 may be scaled up to allow for high volumes of traffic, if desired.

System server 3 can include a number of different system application components, which can include, but are not limited to, personalized search applications 53, general search applications 55, search type transition applications 57, administrative applications 59, business management applications 61, and tracking applications 63. These different system application components can serve to facilitate the different types of searches performed by users and businesses of multi-modal system 1, which can include, but are not limited to, generalized searches and personalized searches. They can also facilitate and permit different types of interactions between multi-modal system 1 and businesses. These interactions can include, but are not limited to, business registration, submission of marketing data, and marketing effectiveness analyses.

To allow for all of the different types of possible interactions between multi-modal system 1 and users and businesses, the various system application components of system server 1 can access database 5 through a number of different data links. Database 5 can include several different types of data, which can be linked with and populated by specific system application components. In one embodiment, the data contained within database 5 can be geo-indexed.

Administrative applications 59 may be used to perform several different administrative tasks, which can include, but are not limited to, administering registration of users and businesses, assigning user identifications, administering access rights, updating information databases and implementing a billing system. The information that can be obtained through administrative applications 59 may be stored in various locations in multi-modal system 1, which can include database 5.

Both users and businesses can use administrative applications 59 to register with multi-modal system 1. Upon registration, both a user and a business can be asked to provide personal information so as to establish proper user identifications. A wide variety of voice verification and authentication techniques may be used to ascertain the identity of a user or a business. The assignment of user identifications may be desirable for the proper administration of personalized searches and business information updates, as well as for the facilitation of interactions between users and enterprises databases, which will be discussed later. User identifications may take different forms, which include, but are not limited to, a user or business name, a user or business telephone number, etc. In one embodiment, user identifications may be combined with the entry of a password. User identifications and passwords may be entered in a variety of different formats, which can include, but are not limited to, orally or in text form. User identifications entered orally can be recognized by multi-modal system 1 through the presence of voice recognition server 7.

The billing system that may be included within multi-modal system 1 may vary widely in its implementation and schemes and may be controlled through administrative applications 59. In one embodiment, each business or user wishing to register with multi-modal system 1 can pay a subscription fee. In another embodiment, users and businesses may be charged a fee per event or action. For example, which is not meant to be limiting, a fee for each search request could be imposed on users, whereas a fee for each instance of inclusion on a list of search results could be imposed on businesses. Of course, it will be apparent to one of skill in the art that other billing schemes can be used with multi-modal system 1 and these are meant to be included herein.

Administrative applications 59 may also be used to set different categories of data. For example, which is not meant to be limiting, administrative applications 59 may be used to create lists of business categories, which may be stored in a category database 65 that may be contained within database 5, as shown in FIG. 2. However, category database 65 can be located elsewhere in multi-modal system 1, if desired. In one embodiment, administrative applications 59 may be responsible for the synchronization of data contained within category database 65 and the data included within public directories, such as the white pages and/or the yellow pages. As shown in FIG. 1, system server 3 may be connected through internet protocol network 13 to a directory services server 67, which can be linked to a directory database 69. Administrative applications 59 may be used to predetermine the times at which category database 65 will be synchronized with public directories, as well as the amount of times it will be synchronized (i.e., on a daily basis, a weekly basis, etc.).

In another embodiment, administrative applications 59 may also include a prioritization and randomization algorithm that can be used to present search results to a user, when either generalized or personalized searches are performed in multi-modal system 1. This algorithm can be based on various weighting factors, which can include, but are not limited to, business category, location, accessibility, availability of coupons or other promotions, etc. Another type of weighting factor that may be used involves the use of a tiered rate structure system, whereby businesses can pay higher fees to ensure higher prioritization in returns from searches. The use of various weighting factors can ensure that the most relevant businesses can be presented to a customer.

Business management applications 61 can be used by businesses to add, update and manage business information contained within multi-modal system 1. Through business management applications 61, a business database 71, which may be contained within database 5 as shown in FIG. 2, may be populated. As discussed above, in one embodiment, administrative applications 59 may be used to pre-determine which types of business categories will be available. If the available business categories have been pre-set, a business interested in registering with multi-modal system 1 can be presented with the pre-determined list and asked to identify its appropriate categories upon registration. Business management applications 61 can be available on any type of interface described above. It may be desirable to restrict the types of interfaces through which business management applications 61 are accessible, depending on the type of data that can be entered or received. In one embodiment, business management applications 61 may be available through business web interface 49.

The information entered by a business through business management applications 61 may vary widely. For example, which is not meant to be limiting, businesses may wish to enter static information as well as more dynamic data. Static information can include, but is not limited to, business name, address, telephone number, logo, images, corporate jingle, and hours of operation. This static information may be located within category database 65. In one embodiment, static information may be automatically entered for a business upon registration, through a connection with a directory services server 67 and directory database 69, as discussed above. Dynamic data can include, but is not limited to, real-time marketing initiatives such as e-coupons, daily specials, etc., which can often be applicable for a short amount of time. This dynamic data can be stored in a dynamic database 73, which, in one embodiment as shown in FIG. 2, can be located within business database 71 in database 5. However, dynamic database 73 can be located in other locations of multi-modal system 1, if desired.

Although not illustrated, businesses can also use presence technologies through business management applications 61 to store information within multi-modal system 1 that can be relayed to users through presence server 9. This information may be stored within an IMPS database 75, which can be located within database 5. Of course, IMPS database 75 can be located elsewhere in multi-modal system 1, if desired. The information stored within IMPS database 75 can vary widely, and include, but is not limited to, available services, whether new patients are accepted, new hours of operations, new services offered, etc. However, unlike current presence technologies, the information is not limited to individual states, but can include the availability of services and other types of functionalities.

Tracking applications 63 can provide registered businesses with the ability to audit or monitor how multi-modal system 1 is serving their needs. These applications may provide the number of web hits, the number of voice calls, the number of connections from voice calls, the number of electronic coupons converted, the number of notifications acted upon, and the like. As shown in the embodiment illustrated in FIG. 2, these statistics may be stored in a statistics database 77, which can be located in database 5. Tracking applications 63 may be accessed through any form of interface 10, as described above. Depending on the type of telephony device used by a business and the type of information contained in statistics database 69, it may be desirable to make tracking applications 63 available only through certain types of interfaces. For example, if the business is using a landline telephone, it may be impractical to send the business long tables of information by voice. In one embodiment, tracking applications 63 can be accessed through business web interface 49.

As discussed previously, several different types of searches are available with multi-modal system 1. These searches can include, but are not limited to, generalized searches and personalized searches. Generalized searches can be performed in multi-modal system 1 by users without the need for users to identify themselves, whereas personalized searches can be performed by users who identify themselves with the system through the use of user identifications as discussed above. A generalized search can be performed using general search applications 55, while a personalized search can be performed using personalized search applications 53. In one embodiment, the general search applications 55 and the personalized search applications 53 can be accessed in the same manner, using for example, which is not meant to be limiting, the same telephone number or the same web interface. In this case, users may be asked upon accessing multi-modal system 1, which type of search they would like to perform, and then be connected with the appropriate system applications component. In another embodiment, different means are required to access these different applications. For example, which is not meant to be limiting, a user may have to use a different phone number or a different web interface.

Figure 3:
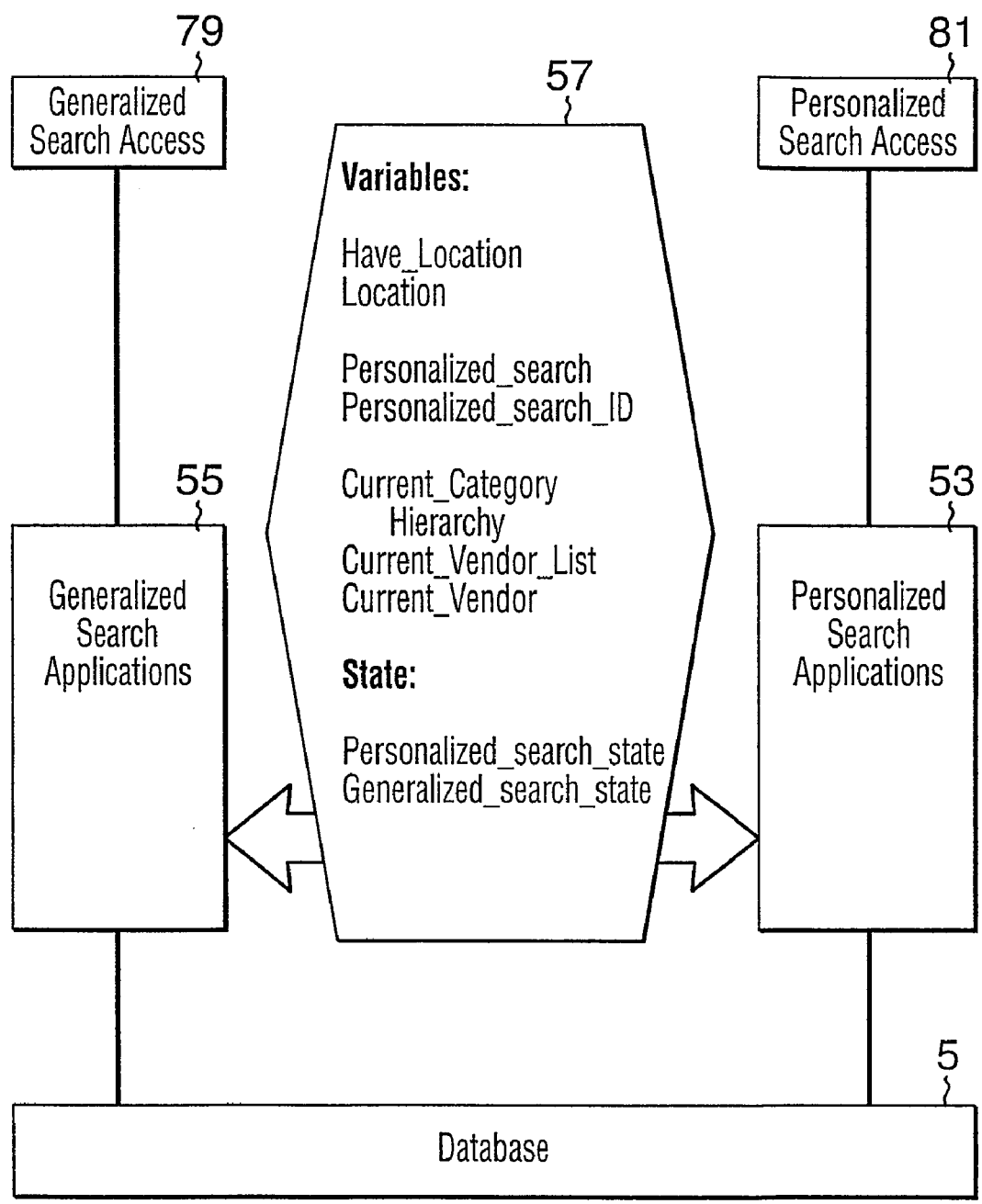
FIG. 3 is a diagrammatic illustration showing an exemplary embodiment of a generalized and a personalized search using the system of this invention.

Examples, which are not meant to be limiting, of a generalized search and of a personalized search are illustrated in FIG. 3. In this embodiment, the two different types of searches must be accessed differently, through generalized search access 79 and personalized search access 81. These different accesses may take different forms, which can include, but are not limited to, different telephone numbers or different web or WAP interfaces.

In a generalized search, a user can access multi-modal system 1 through generalized search access 79. Generalized search access 79 can connect the user to generalized search applications 55. Through generalized search applications 55, users can perform searches in database 5 for various businesses or categories of businesses. Depending on the type of telephony device used by the users, various queries to multi-modal system 1 may be sent through telecommunication internal protocol 11 or through internet protocol network 13, as illustrated in FIG. 1, and voice recognition server 7 may be used if the user is using a voice-based device.

In a personalized search, a user can access multi-modal system 1 through personalized search access 81. Personalized search access 81 can connect the user to personalized search applications 53. Through personalized search applications 53, users can perform personalized searches through personalized information they have stored in multi-modal system 1. Personalized information may be stored, as shown in FIG. 2, in a personalized database 83. In the embodiment shown in FIG. 2, personalized database 83 can be located within database 5. However, personalized database 83 can be located elsewhere in multi-modal system 1, if desired.

The personalized information stored within personalized database 83 can vary widely and include, but is not limited to, user preferences, preferred businesses, personal contact lists, and the like. For example, which is not meant to be limiting, a user may decide to store in multi-modal system 1 a list of preferred dentists or florists along with their contact information, which can save the user from having to locate this information each time he or she wants to make contact with these businesses. This user can then make contact with these individuals by performing a personalized search in multi-modal system 1. The users or businesses stored or "bookmarked" by a user in personalized database 83 can be assigned different settings. For example, a specific florist may be stored under the keyword "florist" or some other keyword selected by the user for easy retrieval. Other settings can include whether specific businesses or users can contact a user to send information such as marketing information. In one embodiment, multi-modal system 1 can then directly connect the user with the desired business after the personalized search.

Figure 4:
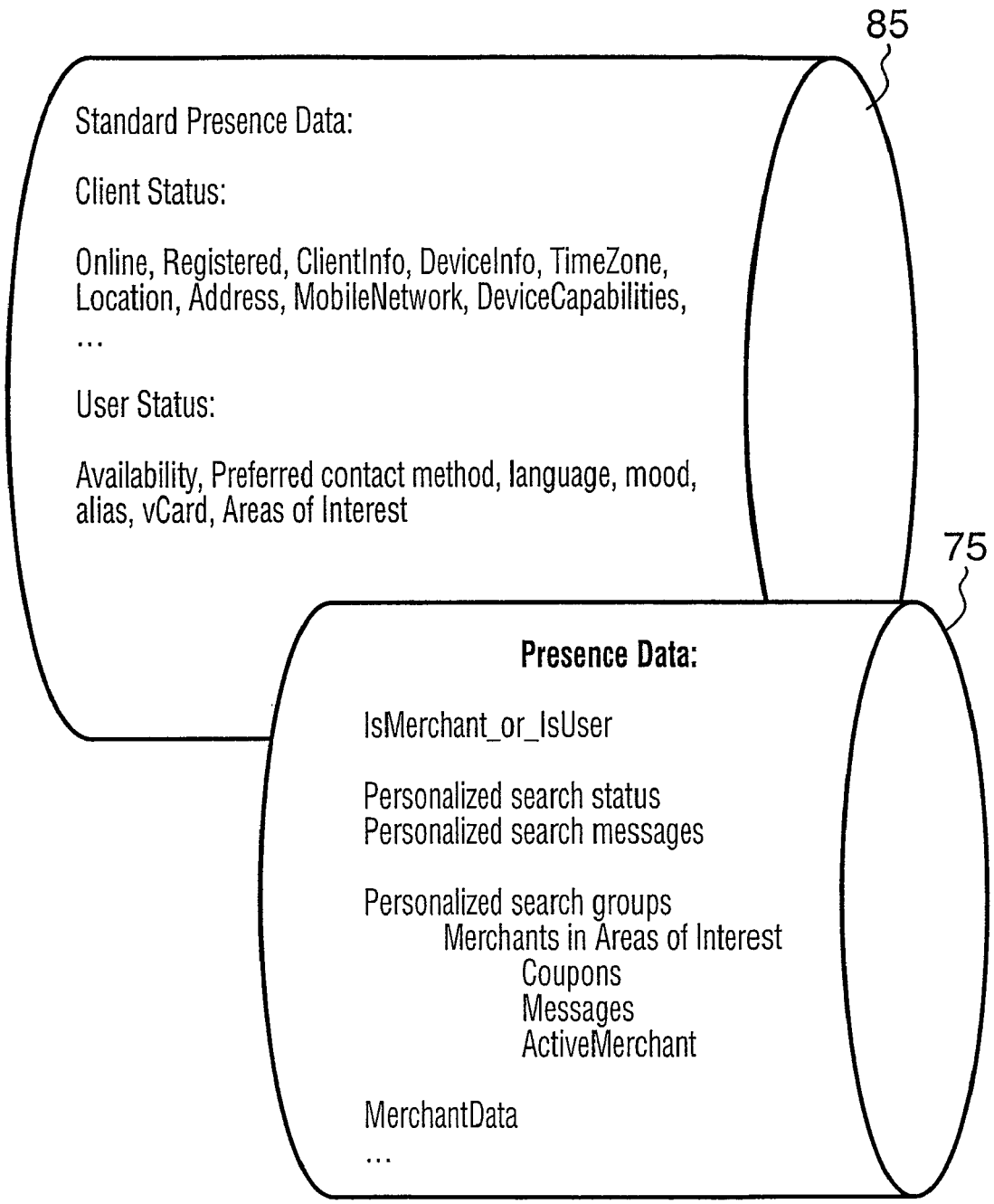
FIG. 4 is a diagrammatic illustration showing a sampling of the data elements available to a business or customer to set up and control the information inputted into the system of this invention.

Another type of personalized information that can be stored by users in multi-modal system 1 involves presence data, as illustrated in FIG. 4. The use of presence data can be made possible through presence server 9. If a user is using a presence-enabled device, this user can store various status information in multi-modal system 1. This type of status information can vary widely in content and format, as discussed above, and can include presence data found in a typical IMPS database 85 of a presence-enabled device. For example, which is not meant to be limiting, a user may wish to store their current status (i.e., away from their telephony device, in a meeting, happy, sad, etc.), as well as interests (i.e., preferences for special types of clothing, sports, events, etc.). However, IMPS database 75 contains more information than that contained in typical IMPS database 85.

A user can store within IMPS database 75 a list of businesses or users that can contact the user through presence technologies. For example, which is not meant to be limiting, a user using a presence-enabled device may give certain businesses they have stored in their personal contact lists in their personalized database permission to contact them via presence technologies to alert them of information, such as marketing information, the availability of specific services, etc. For example, a user performed a search for men's clothing and the store ABC for Men was returned in the search results. ABC for Men can offer to user of multi-modal system 1 the possibility of being alerted to specials only available to users of multi-modal system 1. If the user accepts the business's marketing offer, ABC for Men can be included within the user's personal bookmarks, and can be given permission to contact the user through presence technologies. Consequently, when a special is available from ABC for Men for multi-modal system 1 users, users allowing ABC for Men to contact them can be alerted. Upon receipt of the message, a user can be connected with ABC for Men directly, if desired. In one embodiment, the presence data sent by ABC for Men can have a time expiry, whereby if the message remains unopened for more than a set period of time, the message is deleted.

In one embodiment, presence information may be location specific. For example, which is not meant to be limiting, a user may choose to be contacted by a business through presence technologies only if the user is close to the business's location (i.e., if the user is in close proximity to ABC for Men). IMPS database 75 may also contain a list of e-coupons or other messages sent by businesses or other users and received by a specific user.

In another embodiment of this invention illustrated in FIG. 3, a user currently performing a generalized search may decide to continue searching in a more personalized fashion. This conversion from a generalized search to a personalized search can be performed seamlessly through search type transition applications 57. The converse can also be performed using search type transition applications 57, where a user performing a personalized search can convert the search into a generalized one.

For example, which is not meant to be limiting, a user may be searching for a dentist using a generalized search strategy. When the user locates a dentist of interest, multi-modal system 1 may query the user as to whether he or she wants to add the dentist to their personalized database. If the user wishes to add the dentist to their personalized contact list, the user then identifies himself or herself to multi-modal system 1, whereby the user can then add the dentist and set their preferences for that dentist. In one embodiment, this may include allowing or disallowing the dentist from contacting them through presence technology, as described above. Once the dentist has been added to the user's personal contact list, the user may return to the generalized search, continue with a personalized search or end.

Search type transition applications 57 can contain several different components, which can allow for a user to convert a generalized search into a personalized search and vice versa without losing any status information. Status information can include any information relating to the position of the user in the search tree and any information entered by a user in multi-modal system 1 (i.e., category searched, preferences for certain businesses, avoidance of certain businesses, etc.). In one embodiment, search type transition applications 57 can store the user's position in a generalized search at the moment the search was converted to a personalized search. The user's location can be represented, for example, which is not meant to be limiting, by the node at which the user was located in the generalized search tree. This status information can be used to return the user to the same node after the personalized search is completed and the user returns to the generalized search.

In another embodiment, both generalized and personalized searches can be further enhanced through connection with enterprise databases 58, as shown in FIG. 1. Enterprise databases 58 can include the databases of various businesses included within multi-modal system 1, which can be made available through system server 3. In one embodiment, as illustrated in FIG. 1, enterprise databases can be connected to multi-modal systems 1 via various different secure data links through internet protocol network 13. These secure data links may take various different forms and include, for example, which is not meant to be limiting, common XML interfaces. Of course, other types of data links can be used to connect enterprise databases 58 with system server 3.

The format of specific enterprise databases may be stored in business database 71. Based on this information, multi-modal system 1 can convert the format used in the system to a format suitable to the enterprise database of interest when contacting it. This information can be obtained in a variety of different ways, which include, but are not limited to, remote procedure calls, and/or web requests using http and SOAP protocols.

In another embodiment, enterprise databases can be hosted or co-hosted on multi-modal system 1. In the event that the enterprise database is hosted on multi-modal system 1, the enterprise may be notified by the system at pre-determined times of any changes.

Enterprise databases may be particularly desirable to users who wish to search for a business and make an appointment with that business using multi-modal system 1 as the sole point of contact. For example, which is not meant to be limiting, a user performing either a generalized or a personalized search in multi-modal system 1 may pick a dentist and contact that dentist through multi-modal system 1 to either verify the date and time of an appointment, or to make a new appointment, without having to connect with the dentist in a separate call. In one embodiment, interactions with enterprise databases can be made solely by voice.

A table is provided in FIG. 5 showing a call handling procedure by multi-modal system 1. In a call, a user connects with the system in order to locate business data through a personalized search. The customer enters search criteria and the system generates a search result meeting the search criteria.

While the system can be based on various forms of communication, the illustrated procedure is based on voice interaction between the system and the user. Thus, while the system contemplates voice reception, it could operate using computer data entry, telephone keypad entries, tones, etc. The illustrated procedure is for a predetermined area, such as a city. In one embodiment, a call handling procedure may include a query to determine the area of interest to the customer.

In the first step 87, a user can contact multi-modal system 1 through personalized search access 81. The next step 89 involves the system requesting user identification, whereby the user then states 91 his or her name. The identity of the user can then be verified 93 by having the user repeat 95 a list of numbers, which can be verified through voice print authentication. As will be apparent to one of skill in the art, the use of voice print authentication and a random sequence is but one possible implementation of user identity verification. There are several other different forms of user identity verification that can be used, including, but not limited to, using a keypad to enter an identification number or personal identification number (PIN), as discussed above. Once the user has entered his or her identification, system server 3 can record the identification as the current state of the user (i.e., state={id}). In one embodiment, state information can be stored in personalized search applications 53 or generalized search applications 55.

After user authentication, the system can query 97 the user for the type of information required. In the example shown in FIG. 5, the user is interested in obtaining a dentist appointment. In this example, the user had earlier stored or "bookmarked" in his personalized database the name of a dentist using the default keyword "dentist". Once the user states 99 that a dentist appointment is required, personalized search applications 53 can conduct a keyword search through the user's personal contact list to verify whether a dentist had been previously bookmarked. The system then reports 101 that a Dr. Enamel had been previously bookmarked by the user and can update the user's state to {ID, category=dentist}. However, the system can also report to the user that this particular dentist is away until a certain date because of the use of presence technology by the particular dentist, and can query the user as to whether he would like to use this particular bookmark. When the user answers in the negative 103, a generalized search can be started 105 and the user's state can be updated to {id, category=dentist, entry no=Dr. Enamel}. At this point, the search can be transferred from a personalized search using personalized search applications 53 to a general search using generalized search applications 55 through the use of search type transition applications 57. The system then queries the user as to whether a dentist in close proximity to the user's location is required 107. When the user answers positively 109, the system can locate the user through the use of LBS server 35, as described above. Once the system has located the user, location confirmation can be requested 111 and the user's state updated to {id, category=dentist, entry not=Dr. Enamel, location=$6^{th}$ and $8^{th}$}. With the user's location confirmed, the system can present the user with location-based results of the search for a dentist 113. In the example, shown in FIG. 5, nine dentists are actually located, but Dr. Enamel is removed from the list, as requested earlier by the user, leaving eight dentists in the list. As previously discussed, the system can present the results of the search to the user using various sorting algorithms. Along with the search results, additional information on each dentist may also be presented to the user, from which the user can select 115 a specific dentist. The state of the user can then be updated to {id, category=dentist, entry not=Dr. Enamel, location=$6^{th}$ and $8^{th}$, current entry=Dr. Cap}. In this example, because the user had previously began a personalized search and logged onto the system, the system can offer 117 the user the option of adding the selected dentist to his list of personalized contacts. No additional log-in is required as the state of the user carries his log-in information. However, if the user had not previously logged into the system, the user would be prompted for user authentication information.

Once the user decides to add 119 Dr. Cap to his personal contact list, the user is returned to the personalized search applications 53, where the user is queried 121 as to the attributes he wishes to assign Dr. Cap. For example, the user is queried as to whether he wishes to bookmark Dr. Cap using the word "dentist", which can later be used to find Dr. Cap rapidly. The system can then query 123 the user as to whether he will allow Dr. Cap to send him marketing information. Since the user answers 125 in the negative, the system then queries 127 the user for the next step. The user replies 129 that an appointment is required. At this point, a specific enterprise dialog can begin, whereby multi-modal system 1 can seamlessly connect the user with the dentist's enterprise database to book an appointment. As discussed earlier, the enterprise database can be included within multi-modal system 1 or can be a separate entity from the system, whereby the user is simply connected to the database. The user is not required to provide user authentication to the enterprise database because this information is part of the user's state, which is used during the connection to the enterprise database of interest.

The next step 131 involves an enterprise specific application, using the enterprise database querying the user for the type of appointment required. The user can then book an appropriate appointment. Once the appointment has been booked, the user is then transferred 133 from the enterprise specific application back to his personalized search in multimodal system 1, where he is queried for the next step. When the user requests directions 135, the system can provide 137 directions to the user, based on the previously established location. When the user then requests 139 a new search, the system can update its state information on the user to {id, location=$6^{th}$ and $8^{th}$}. Upon the user's request 141 for an Italian restaurant, the system can quickly perform a keyword search in the user's personal contact list. When an Italian restaurant is not located, a generalized search can be started 143, where the user is again transferred using search type transition applications 57, as described above, to general search applications 55. If the user again requests a restaurant located close to his current location, location information does not have to be obtained again since it is already in the user's state (i.e., state={id, category=Italian restaurant, location=$6^{th}$ and $8^{th}$}. The system can then report 145 the list of restaurants meeting the requirements of the user, in much the same fashion as the results presented to the user for the dentist search.

While the invention has been described in conjunction with the disclosed embodiments, it will be understood that the invention is not intended to be limited to these embodiments. On the contrary, the current protection is intended to cover alternatives, modifications and equivalents, which may be included within the spirit and scope of the invention. Various modifications will remain readily apparent to those skilled in the art.

What is claimed is:

1. A system for searching contact information from a database using one or more voice prompts provided by a user, said system comprising:
   a user database for storing contact information and said user database storing one or more attributes associated with said user;
   a voice interface for said user database, said voice interface including a voice recognition module for converting said voice prompts into one or more search parameters;
   a module for searching said user database for contact information according to one or more of said search parameters and according to one or more of said stored user attributes.

2. The system as claimed in claim 1, wherein said voice interface for said user database includes an identification module, said identification module being responsive to a prompt for validating a user.

3. The system as claimed in claim 2, wherein said attributes associated with said user includes a location indicator, said location indicator providing a search criterion for searching contact information corresponding to a location within a given distance relative to said location indicator.

4. The system as claimed in claim 3, wherein said user attributes include one or more category indicators, each of said category indicators comprising a plurality of contacts.

5. The system as claimed in claim 1, further including a directory database for storing a plurality of directory entries, and a module for searching said directory database for said directory entries associated with one or more of said search parameters.

6. The system as claimed in claim 5, further including a module for extending a search to said directory database when said module for searching said user database returns insufficient contact information.

7. The system as claimed in claim 5, further including a module for saving information associated with said directory entries from said directory database as contact data in said user database, said module being responsive to one or more additional prompts from said user.

8. The system as claimed in claim 5, wherein said attributes associated with said user includes a location indicator, said location indicator providing a search criterion for searching contact information located within a given distance relative to said location indicator.

9. The system as claimed in claim 8, wherein said voice interface for said user database includes an identification module, said identification module being responsive to a voice input for validating a user.

10. A method for searching contact information in a database, said method comprising the steps of:
    identifying a user associated with the search,
    retrieving one or more attributes associated with the user;
    receiving one or more voice prompts from the user;
    converting said voice prompts into one or more search criteria;
    searching the database for contact information according to one or more of said search criteria and one or more of said stored user attributes; and
    retrieving said contact information.

11. The method as claimed in claim 10, wherein said step of retrieving said contact information comprises converting said contact information into speech for playback to the user.

12. The method as claimed in claim 10, wherein said step of identifying the user comprises receiving a vocal identifier from the user and confirming the identity of the user based on said vocal identifier.

13. The method as claimed in claim 10, wherein said attributes associated with the user include a location indicator, said location indicator providing an indication of a current position for the user.

14. The method as claimed in claim 13, wherein said attributes associated with the user include one or more user preferences, said user preferences providing one or more search criteria for searching the database.

15. The method as claimed in claim 10, wherein said attributes associated with the user include a permission indicator, said permission indicator allowing a third party to provide information to the user.

16. The method as claimed in claim 15, wherein the information received from said third party includes a mechanism for the user to contact said third party.

17. The method as claimed in claim 10, further including the step of storing data associated with said retrieved contact information, said data being stored in a user database.

18. The method as claimed in claim 17, wherein said attributes include one or more contact categories, and wherein said data is stored according to one or more of said contact categories.

19. The method as claimed in claim 17, further including a directory database and the step of searching said directory database based on one or more of said search criteria and one or more of said stored user attribute, and the step of retrieving one or more directory entries from said directory database.

20. The method as claimed in claim 19, further including the step of adding information associated with one or more of said directory entries to said user database.

21. The method as claimed in claim 17, wherein said data comprises contact information, and said contact information is stored in one or more categories, and wherein each of said categories provides a search criterion for the user.

22. A system for searching contact information from a database using one or more voice prompts provided by a user, said system comprising:
- a user database for storing contact information and said user database storing one or more attributes associated with said user;
  - a voice interface for said user database, said voice interface including a voice recognition module for converting said voice prompts into one or more search parameters;
  - a module for searching said user database for contact information according to one or more of said search parameters and according to one or more of said stored user attributes; and
- a directory database for storing a plurality of directory entries, and a module for extending a search to said directory database when said module for searching said user database returns insufficient contact information.

23. The system as claimed in claim 22, further including a module for saving information associated with said directory entries from said directory database as contact data in said user database, said module being responsive to one or more additional prompts from said user.

24. The system as claimed in claim 23, wherein said attributes associated with said user includes a location indicator, said location indicator providing a search criterion for searching contact information located within a given distance relative to said location indicator.

25. A system for searching contact information from a database using one or more voice prompts provided by a user, said system comprising:
- a user database for storing contact information and said user database storing one or more attributes associated with said user;
  - a voice interface for said user database, said voice interface including a voice recognition module for converting said voice prompts into one or more search parameters;
  - a module for searching said user database for contact information according to one or more of said search parameters and according to one or more of said stored user attributes; and
- a directory database for storing a plurality of directory entries;
- a module for extending a search to said directory database when said module for searching said user database returns insufficient contact information; and
- a module for saving information from said directory database in said user database.

26. A method for searching contact information in a user database, said method comprising the steps of:
- identifying a user associated with the search,
- retrieving one or more attributes associated with the user;
- receiving one or more voice prompts from the user;
- converting said voice prompts into one or more search criteria;
- searching the user database for contact information according to one or more of said search criteria and one or more of said stored user attributes;
- extending searching to one or more other databases if the searching of the user database returns insufficient contact information;
- retrieving said contact information.

27. The method as claimed in claim 26, further including storing information retrieved from said one or more other databases in the user database.

28. A system for searching contact information from a database using one or more voice prompts provided by a user, said system comprising:
- a user database for storing contact information and said user database storing one or more attributes associated with said user;
- a voice interface for said user database, said voice interface including a voice recognition module for converting said voice prompts into one or more search parameters;
- a module for searching said user database for contact information according to one or more of said search parameters and according to one or more of said stored user attributes; and
- wherein said attributes associated with said user include a location indicator, said location indicator providing another search parameter and said module for searching being responsive to said location indicator for searching contact information located within a given distance relative to said location indicator.

29. The system as claimed in claim 28, further including a directory database configured for storing a plurality of directory entries and a module for extending a search to said directory database when said module for searching said user database returns insufficient contact information.

30. The system as claimed in claim 29, further including a module configured for saving data associated with one or more of said plurality of directory entries as contact data in said user database.

* * * * *